Patented Aug. 28, 1951

2,565,503

UNITED STATES PATENT OFFICE 2,565,503

CYCLOALKYLAMINE SALTS OF PENICILLIN AND PREPARATION THEREOF

Murray A. Kaplan, Syracuse, N. Y., assignor to Bristol Laboratories, Inc., Syracuse, N. Y., a corporation of New York No Drawing. Application September 4, 1946, Serial No. 694,827

11 Claims. (Cl. 260—239.1)

This invention relates to penicillin and salts of penicillin, and more particularly to cycloalkylamine salts of penicillin.

An object of this invention is to produce antibiotic substances efficiently and economically.

Another object of this invention is to isolate stable salts of penicillin which possess extremely high antibiotic characteristics.

Another object of this invention is to provide penicillin salts having a high degree of purity.

In the production and utilization of penicillin and salts thereof for use as antibiotic products, various methods have heretofore been proposed for concentrating and purifying such products. The concentration of penicillin in the broth after fermentation expressed as Oxford units has usually been found to be within the range of from 150 to 800 units per ml. To utilize a penicillin product for therapeutic purposes, it is desirable that the concentration be in the neighborhood of 5,000 to 300,000 units per ml. The penicillin or salt thereof contained in the fermentation broth is ordinarily isolated and concentrated by repeated conversion to penicillin, extraction with a suitable solvent, such as amyl acetate, and reconversion to a salt of penicillin such as sodium penicillin. While concentrations of 30,000 to 50,000 Oxford units per ml. may be obtained by the practice of this method, the products so produced are substantially contaminated with impurities such as plant pigments. The purpose of conversion to the acid form and reconversion to a salt, such as sodium penicillin, is to concentrate and purify the product. Since the utilization of the formation of certain salts of penicillin, such as the sodium salt thereof, results in impure products, various other derivatives have been proposed for securing greater purity of the resulting product. For example, a crystalline benzylamine derivative has been reported (Science, 102, 628 (1945)) but this derivative has been found, due apparently to a major modification of the penicillin structure, to have substantially no antibiotic activity. Moreover, this benzylamine derivative has not by an known methods been regenerated to a substance possessing the antibiotic activity of the penicillin from which it was derived.

In accordance with this invention, salts of penicillin are utilized in the isolation and purification of penicillin and salts thereof whereby a substantially purer product having higher antibiotic action is obtained than by the methods heretofore employed. These salts, which are new compounds, are the unsubstituted cycloalkylamine salts of penicillin and may be prepared by reacting penicillin with an unsubstituted cycloalkylamine, or alternately by reacting a salt of an unsubstituted cycloalkylamine with a salt of penicillin. Desirably, the unsubstituted cycloalkylamine salt of penicillin is produced by reacting an unsubstituted cycloalkylamine, such as cyclohexylamine or cyclopentylamine, with penicillin or a salt of penicillin, such as sodium penicillin, in a solvent in which the penicillin or the penicillin salt is soluble and the resulting reaction product is substantially insoluble. It is desirable that the unsubstituted cycloalkylamine or salt thereof be soluble in the solvent. As a result of this procedure, the unsubstituted cycloalkylamine salt of penicillin separates in the solvent from which it may readily be removed. The practice of this preferred procedure results in a substantially pure product relatively free from pigments when compared with the salts of penicillin prepared by methods heretofore practiced.

By penicillin is meant one or more of the several antibiotics of empirical formula

$$C_9H_{11}O_4SN_2 \cdot R$$

produced by the growth of *Penicillium notatum*, *Penicillium chrysogenum*, or these same substances whenever produced by other means. Chemical characteristics of penicillin and possible structures are disclosed in an article presented by the Committee on Medical Research, O. S. R. D., Washington, and the Medical Research Council, London, in Science 102, 627–9 (1945). Penicillin is indicated as being a complex monocarboxylic acid. The product formed by the reaction between the unsubstituted cycloalkylamine and penicillin is believed to be the cycloalkylammonium salt of this carboxylic acid group. Examples of the unsubstituted cycloalkylamines which may be employed to produce the salts of this invention are cyclopropylamine, cyclobutylamine, cyclopentylamine and cyclohexylamine.

These unsubstituted cycloalkylamine salts of penicillin and the processes of this invention may be utilized in the isolation and purification of penicillin and salts of penicillin. For example, the penicillin contained in an extract, preferably having a concentration above 5,000 Oxford units per ml., obtained from the fermentation broth may be reacted with cyclohexylamine in a solvent, such as amyl acetate, in which the penicillin and cyclohexylamine are soluble and the cyclohexylamine salt of penicillin is insoluble, after which the cyclohexylamine salt may be separated from the solvent. The cyclohexylamine salt of penicillin for use therapeutically must be converted to a derivative of penicillin which is materially less toxic. This conversion may be achieved by dissolving the cyclohexylamine salt of penicillin in water, converting it to penicillin with a mineral acid at a temperature below about 10° C., extracting the penicillin with amyl acetate, and reconverting the penicillin to a non-toxic derivative of penicillin such as the sodium salt thereof. By the use of the unsubstituted cycloalkylamine salts of penicillin and by the practice of the method in accordance with this invention, substantially pure derivatives of penicillin are produced.

There are many solvents in which the unsubstituted cycloalkylamine salts of penicillin are substantially insoluble but in which penicillin and the cycloalkylamines are soluble, such as ether, amyl acetate, ethylene dichloride, 2-nitro propane and isopropyl acetate. Accordingly, if it is desired to purify penicillin, it may be dissolved in one of these latter solvents, such as ether, and the unsubstituted cycloalkylamine added to react with the penicillin to produce the salt of unsubstituted cycloalkylamine. The unsubstituted cycloalkylamine salt of penicillin separates out of the solution whereby it may be easily removed from the reaction mixture and subsequently reconverted to penicillin. Instead of using penicillin to produce the unsubstituted cycloalkylamine salts thereof, certain salts of penicillin, such as ammonium penicillin, may be used which are soluble in solvents in which the unsubstituted cycloalkylamine salts of penicillin are insoluble.

A more comprehensive understanding of this invention is obtained by reference to the following examples:

*Example 1.*—To one liter of an aqueous extract of sodium penicillin containing between 30,000 and 50,000 Oxford units per ml. maintained at a temperature of 5° C. or below are added about 2½ liters of amyl acetate also maintained at a temperature of 5° C. or below. To this mixture is added a 20% aqueous solution of phosphoric acid, or any other mineral acid such as hydrochloric or sulfuric acid, with agitation, until the pH of the aqueous phase is reduced to about 2.0 to 2.5. The extract is then separated from the aqueous phase. The aqueous phase is then agitated with about 2.5 liters of amyl acetate at a temperature of 5° C. or below, and the extract separated from the aqeous phase. Instead of amyl acetate, any other suitable extractant, such as ethylene dichloride, may be employed in which penicillin and cyclohexylamine are soluble, but the cyclohexylamine salt of penicillin is not. The amyl acetate extracts are combined, filtered through coarse filter paper or diatomaceous earth, and dried over a suitable dehydrating agent, such as sodium sulfate. The total volume of the combined extracts should preferably be such as to result in a concentration of penicillin of at least 7,000 Oxford units per ml. The dried extract is treated with agitation at about 5° C. or lower with a solution of cyclohexylamine until the pH of 5 ml. of water shaken with one ml. of the treated extract is about 6.5 to 7.0. The solution of cyclohexylamine may be of substantially any concentration. However, a solution of 2 ml. of cyclohexylamine in 50 ml. of amyl acetate has been found satisfactory for this purpose. After the cyclohexylamine has been added, the solution is allowed to stand at a temperature of about 5° C. or below for about ½ to ¾ of an hour. During the addition of the cyclohexylamine, the cyclohexylamine salt of penicillin is formed, and this salt separates out of the amyl acetate solution. The solid precipitate formed is filtered off, washed with a small amount of amyl acetate, washed with a very small amount of acetone to remove impurities, such as pigments, washed with ether to remove the acetone and finally dried in air or in a desiccator. The acetone wash contains a small amount of the cyclohexylamine salt of penicillin, and this salt contained therein may, if desired, be recovered by any suitable means such as conversion to penicillin and extraction of the penicillin. Average recoveries of penicillin resulting from the practice of the above procedure have been about 74% if amyl acetate is employed as the extractant, and 66% if ethylene dichloride is used as the extractant, based on the penicillin present in the original solution. If desired, the cyclohexylamine salt of penicillin may be converted to penicillin by first dissolving the salt in a suitable solvent, such as water, acidifying to about pH 2 with mineral acid, such as 20% phosphoric acid, at a temperature of 5° C. or below and extracting the penicillin with a suitable solvent such as amyl acetate. If another salt such as sodium penicillin is desired, the penicillin obtained from the reaction product is treated with sodium hydroxide to form sodium penicillin.

The cyclohexylamine salt of penicillin is the cyclohexylammonium salt of penicillin. It is soluble in many of the common solvents, such as chloroform, alcohol, formamide and water. It is substantially insoluble in ether, amyl acetate, ethylene dichloride, 2-nitro propane and isopropyl acetate. It appears to be nonhygroscopic. Nitrogen analysis (Kjeldahl) gave the following results:

Calculated, 9.70% (calculated as the mono cyclohexylammonium salt of penicillin G, $C_9H_{11}O_4SN_2CH_2C_6H_5 \cdot C_6H_{11}NH_2$

MW 433).

Found, 9.35%, 9.70%.

Analysis by means of penicillinase gave the following results (penicillinase, an enzyme, hydrolyzes penicillin, setting free an acid group which may be titrated with standard base):

O. u./mg.
Calculated (as the mono cyclohexylammonium salt of penicillin G using 1667 O. u./mg. as potency of the sodium salt of penicillin G) _____ 1,365

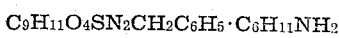

Found (penicillinase) _____ { 1,344 / 1,384 / 1,322

The melting point of the cyclohexylamine derivative of the penicillin produced by fermentation (a mixture of several penicillins) was found to be 127–128° C. (uncorr.). The cyclohexylamine derivative of penicillin G was found to have a melting point of 139–142° C. (uncorr.).

*Example 2.*—One liter of a relatively crude aqueous solution of sodium penicillin containing from 1,000 to 3,000 Oxford units per ml. is acidified at 5° C. or lower to a pH of 2.0 to 2.5 and extracted with ½ volume of ethylene dichloride. The extract is filtered and dried to remove water and a solution of cyclohexylamine in ethylene dichloride is added until the pH of 5 ml. of water shaken with one ml. of solution attains a value of about pH 6.5 to 7. The cold solution is permitted to stand for ½ to 2 hours at a temperature of 5° C. or lower, after which the precipitate which is formed is filtered off, washed with a small amount of ethylene dichloride, washed with a very small amount of acetone to remove impurities, such as pigments, washed with ether to remove the acetone and finally dried in air or in a desiccator. Average recoveries of penicillin in this precipitate have been about 40% or higher, based on the penicillin present in the original buffer. Recoveries as high as 71% have been obtained using this procedure. The precipitated cyclohexylamine salt of penicillin may be further purified on recrystallization by dissolving in the minimum amount of absolute alcohol, hot acetone, or 85% alcohol, adding ether to the cloud point, cooling overnight in the icebox (temperature about 5° C.), and recovering the precipitated product.

*Example 3.*—A small amount of the cyclohexylamine salt of penicillin obtained by the methods described in Examples 1 or 2 was dissolved in water and shaken with 2 volumes of chloroform with acidification of the aqueous phase to a pH of 2.5. The chloroform extract was separated, washed with $\frac{1}{10}$ to $\frac{1}{5}$ volume of distilled water, and then extracted with pH 7.0 phosphate buffer. Assay of this buffer extract indicated that substantially all of the activity originally present in the cyclohexylamine salt of penicillin had been recovered in the pH 7.0 phosphate buffer. The product contained in the phosphate buffer was sodium penicillin.

*Example 4.*—An aqueous solution of the cyclohexylamine salt of penicillin was acidified and extracted with chloroform as described in Example 3. The penicillin in the chloroform extract was extracted into water at pH 7.0 (by adding 2% sodium hydroxide solution to increase the pH of the aqueous phase from 2.0 to 7.0) and lyophilized. Bioassay indicated that the material was substantially pure sodium penicillin.

*Example 5.*—A solution of penicillin in ether was neutralized by shaking with an aqueous ammonia solution. The aqueous layer containing ammonium penicillin was separated from the ether layer and lyophilized. The ammonium penicillin thus produced was shaken with acetone and the solution filtered to remove undissolved material. The filtrate was treated with cyclohexylamine and a white precipitate was formed. This precipitate was separated and dried. Its identity as the cyclohexylamine salt of penicillin was established by melting point and by a mixed melting point with authentic samples of cylohexylamine salt of penicillin. Other salts of penicillin, such as the alkali metal salts, for example potassium penicillin, and the alkali metal salts, such as calcium penicillin, may be reacted with cyclohexylamine to produce the reaction product of penicillin and cyclohexylamine.

*Example 6.*—An aqueous solution of sodium penicillin is mixed with an aqueous solution containing a molar equivalent amount of cyclohexylamine hydrochloride. The solution thus formed is lyophilized, and the cyclohexylamine salt of penicillin in the lyophilized product is separated from the co-produced sodium chloride by extraction with chloroform, in which the cyclohexylamine salt of penicillin is soluble. Penicillin or sodium penicillin may be obtained from the chloroform solution of the cyclohexylamine salt of penicillin in accordance with the methods outlined in Example 1.

*Example 7.*—The cyclopentylamine salt of penicillin is prepared by reacting penicillin with cyclopentylamine in the same manner as described in Example 1, for the preparation of the cyclohexylamine salt of penicillin. The procedure outlined in Example 1 is followed, except that instead of using a solution of cyclohexylamine, a solution of cyclopentylamine is employed.

The terms and expression which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A cyclopentylamine salt of penicillin.
2. Cyclohexylamine salt of penicillin.
3. A salt of penicillin and an amine selected from the class consisting of cyclopropylamine, cyclobutylamine, cyclopentylamine and cyclohexylamine.
4. The process of producing penicillin salt of an amine selected from the class consisting of cyclopropylamine, cyclobutylamine, cyclopentylamine and cyclohexylamine, said process comprising contacting penicillin with said amine and recovering said penicillin salt of said amine.
5. The process of producing a cyclohexylamine salt of penicillin which comprises contacting penicillin with cyclohexylamine and recovering the cyclohexylamine salt of penicillin.
6. The process of producing a penicillin salt of an amine selected from the class consisting of cyclopropylamine, cyclobutylamine, cyclopentylamine and cyclohexylamine, said process comprising contacting penicillin with said amine in a solvent in which penicillin and said amine are soluble and said penicillin salt of said amine are substantially insoluble, and recovering said penicillin salt of said amine from said solvent.
7. The process of producing a cyclohexylamine salt of penicillin which comprises contacting penicillin with cyclohexylamine in a solvent in which penicillin and cyclohexylamine are soluble and the cyclohexylamine salt of penicillin is substantially insoluble, and recovering the cyclohexylamine salt of penicillin from said solvent.
8. The process of producing a cyclohexylamine salt of penicillin which comprises contacting penicillin with cyclohexylamine in a solvent in which penicillin and cyclohexylamine are soluble and the cyclohexylamine salt of penicillin is substantially insoluble, recovering the cyclohexylamine salt of penicillin from said solvent, and washing the recovered cyclohexylamine salt of penicillin with a solvent in which the impurities contained in the recovered cyclohexylamine salt of penicillin are soluble and in which the cyclohexylamine salt of penicillin is insoluble.
9. The process of producing a cyclohexylamine salt of penicillin which comprises contacting penicillin and cyclohexylamine in amyl acetate, recovering the cyclohexylamine salt of penicillin from the amyl acetate and washing the recovered cyclohexylamine salt of penicillin with acetone to remove impurities therefrom.
10. Cyclopropylamine salt of penicillin.
11. Cyclobutylamine salt of penicillin.

MURRAY A. KAPLAN.

REFERENCES CITED

The following references are of record in the file of this patent:

Abraham, "British Journal of Experimental Pathology," June 1942, vol. 23, pp. 103–123.

Merck, March 31, 1944, M–XV–b, Penicillin G and Related Compounds, page 1.

Heyden Discovery Report HIII, 2 pages, May 22, 1944.

Heyden IV, 2 pages, June 15, 1944.

British Reports 234, pp. 1–5, February 12, 1946.